(12) United States Patent
Brendelberger et al.

(10) Patent No.: US 10,663,208 B2
(45) Date of Patent: May 26, 2020

(54) HEAT TRANSFER PARTICLES FOR SOLAR-DRIVEN THERMOCHEMICAL PROCESSES

(71) Applicant: Deutsches Zentrum Für Luft- und Raumfahrt e.V., Cologne (DE)

(72) Inventors: Stefan Brendelberger, Cologne (DE); Jan Felinks, Witten (DE)

(73) Assignee: Deutsches Zentrum für Luft-und Raumfahrt e.V., Cologne (DE)

( * ) Notice: Subject to any disclaimer, the term of this patent is extended or adjusted under 35 U.S.C. 154(b) by 743 days.

(21) Appl. No.: 14/705,335

(22) Filed: May 6, 2015

(65) Prior Publication Data

US 2015/0345854 A1 Dec. 3, 2015

(30) Foreign Application Priority Data

Jun. 3, 2014 (DE) .................. 10 2014 210 482

(51) Int. Cl.
*F25D 5/00* (2006.01)
*F28D 20/00* (2006.01)
*C01B 3/06* (2006.01)
*F24S 80/20* (2018.01)
*F24S 90/00* (2018.01)
(Continued)

(52) U.S. Cl.
CPC ............... *F25D 5/00* (2013.01); *B01J 8/087* (2013.01); *C01B 3/063* (2013.01); *C01B 3/105* (2013.01); *F24S 80/20* (2018.05); *F24S 90/00* (2018.05); *F28D 20/003* (2013.01); *B01J 2208/00451* (2013.01); *Y02E 10/40* (2013.01); *Y02E 60/142* (2013.01); *Y02E 60/36* (2013.01); *Y02E 70/30* (2013.01)

(58) Field of Classification Search
CPC ........ F28D 17/005; F28D 20/003; F25D 5/00; F25D 5/02; F24S 80/20; F24S 90/00; F24S 60/20; F24S 70/10; F24S 70/12; F24S 70/16; C01B 3/063; C01B 3/105; C01B 2203/0838; B01J 8/087; B01J 2208/00451; Y02E 70/30; Y02E 10/40; Y02E 60/36; Y02E 60/16; F28C 3/10; F03G 6/065; F03G 6/067
See application file for complete search history.

(56) References Cited

U.S. PATENT DOCUMENTS 8,420,032 B1 4/2013 Ermanoski
9,651,313 B2 * 5/2017 Trainham ............ F28D 20/0056
(Continued)

FOREIGN PATENT DOCUMENTS

EP 1 712 517 A1 10/2006

OTHER PUBLICATIONS

William C. Chueh et al., "High-Flux Solar-Driven Thermochemical Dissociation of CO2 and H2O Using Nonstoichiometric Ceria", Science, Dec. 24, 2010, vol. 330, ScienceMag.org.
(Continued)

*Primary Examiner* — Frantz F Jules
*Assistant Examiner* — Erik Mendoza-Wilkenfel
(74) *Attorney, Agent, or Firm* — Clements Bernard Walker

(57) ABSTRACT

The present invention relates to a process for performing a chemical reaction consisting of at least two sequential reversible steps characterized by being performed in a cycle, and to a reactor for performing such process.

13 Claims, 5 Drawing Sheets

(51) Int. Cl.
*B01J 8/08* (2006.01)
*C01B 3/10* (2006.01)

(56) References Cited

U.S. PATENT DOCUMENTS

| | | | |
|---|---|---|---|
| 2012/0022310 A1* | 1/2012 | Schneider | C07C 2/76 585/415 |
| 2012/0048963 A1* | 3/2012 | Sharma | A61M 11/041 239/34 |
| 2012/0180988 A1* | 7/2012 | LaForce | F25J 1/0012 165/104.13 |
| 2013/0004801 A1* | 1/2013 | Henry | H01M 8/0606 429/9 |
| 2013/0234069 A1 | 9/2013 | Henry | |
| 2013/0257056 A1* | 10/2013 | Ma | F03G 6/065 290/52 |
| 2014/0130791 A1* | 5/2014 | De Risi | F24S 80/20 126/652 |
| 2014/0298822 A1* | 10/2014 | Ma | F03G 6/067 60/783 |

OTHER PUBLICATIONS

Ivan Ermanoski et al., "A New Reactor Concept for Efficient Solar-Thermochemical Fuel Production", Journal of Solar Energy Engineering, Aug. 2013, pp. 031002-1-031002-10, vol. 135, ASME.

Justin Lapp et al., "Heat Transfer Analysis of a Solid-Solid Heat Recuperation System for Solar-Driven Nonstoichiometric Redox Cycles", Journal of Solar Energy Engineering, Aug. 2013, pp. 031004-1-031004-11, vol. 135, ASME.

Sarada Kuravi et al., "Thermal energy storage technologies and systems for concentrating solar power plants", Progress in Energy and Combustion Science, Mar. 22, 2013, pp. 285-319, vol. 39, Elsevier.

Richard B. Diver et al., "Solar Thermochemical Water-Splitting Ferrite-Cycle Heat Engines", Journal of Solar Energy Engineering, Nov. 2008, pp. 041001-1-041001-8, vol. 130, ASME.

Richard B. Diver et al., "Testing of a CR5 Solar Thermochemical Heat Engine Prototype", Proceedings of the ASME 2010 4th International Conference on Energy Sustainability, May 2010, pp. 1-8, ASME.

Kuravi, Sarada et al., Thermal Energy Storage Technologies and systems for concentrating solar power plants, www.elsevier.com/locate/pecs, Progress in Energy and Combustion Science 39 (2013) pp. 285-319.

* cited by examiner

HEAT TRANSFER PARTICLES FOR SOLAR-DRIVEN THERMOCHEMICAL PROCESSES

1) FIELD OF THE INVENTION

The present invention relates to a process for performing a chemical reaction consisting of at least two sequential reversible steps, and to a reactor for performing such process.

2) BACKGROUND

Solar-driven thermochemical cycles, such as for cleaving water into hydrogen and oxygen, or the reduction of $CO_2$ to CO, are the subject of intensive research. This is because thermochemical cycles have a high theoretical efficiency potential and, at the same time, particular requirements are placed on the processes. FIG. 1 schematically shows a corresponding cycle. In a first step, reduction of a redox material takes place. Oxygen is released thereby. The required high temperature heat can be obtained, for example, through concentrated solar radiation. The redox material reduced in this reduction step is then employed in a cleaving step. In this cleaving step, the actual cleaving of water, for example, takes place. Hydrogen is released thereby. The oxygen contained in the water is used for oxidizing the redox material. The cleavage of $CO_2$ is similar. CO is released, and the released oxygen molecule is incorporated in the redox material. The redox material oxidized thereby is then employed again in the reduction step.

Currently, few materials are known that resist the requirements on the temperatures and reaction atmosphere and are still active. Cerium oxide is frequently used as a redox material. With it, reduction is possible at temperatures of above 1200° C. and under oxygen partial pressures of less than 1 mbar, in particular. The cleavage step usually takes place at temperatures of less than 1000° C. Thus, there is a temperature difference of more than 200° C. between the reduction step and the cleavage step, which the redox material must resist. The temperatures mentioned here are guidelines. The temperature at which the reduction and oxidation take place depends, inter alia, on the selection of the redox material, of the material to be cleaved, and of the oxygen partial pressure, so that the real temperature may both exceed or fall below the values mentioned here.

As compared to direct thermal water cleavages, the advantage of such thermochemical cycles is the lower temperature, in particular. Solar-driven thermochemical cycles usually take place in a reactor coupled with a receiver for taking up the solar energy. Receiver/reactor concepts for the solar-driven thermal cleavage of water or $CO_2$ are described, for example, by Chue, W. C., et al., 2010, "High-Flux Solar-Driven Thermochemical Dissociation of $CO_2$ and $H_2O$ Using Nonstoichiometric Ceria", Science, Vol. 330, pp. 1797-1801; Ermanoski, I., et al., 2013, "A New Reactor Concept for Efficient Solar-Thermochemical Fuel Production", ASME Journal of Solar Energy Engineering, Vol. 135, pp. 031002-1 to 031002-10; Driver, R. B., et al., 2008, "Solar Thermochemical Water-Splitting Ferrite-Cycle Heat Engines", ASME Journal of Solar Energy Engineering, Vol. 130(4), p. 041001; Driver, R. B., et al., 2010, "Testing of a CR5 Solar Thermochemical Heat Engine Prototype" ASME, Phoenix, Vol. 2, pp. 97-104, and Lapp, J. et al., 2013, "Heat Transfer Analysis of a Solid-Solid Heat Recuperation System for Solar-Driven Nonstoichiometric Redox Cycles", ASME Journal of Solar Energy Engineering, Vol. 135, pp. 031004-1 to 031004-11.

The integration of these receivers/reactors into an overall process could not be realized satisfactorily as yet, because partial requirements of the overall process are not or insufficiently taken into account by the mentioned receivers/reactors. However, high overall efficiencies can be realized only by taking all the requirements into account at the same time.

Particular requirements are predetermined by the redox material. The latter must be able to go through the process in a cyclic manner, i.e., the material must go through the individual process steps several times without degrading. For the reduction, high temperatures of frequently 1200° C. or more and low oxygen partial pressures are usually necessary. The actual cleaving reaction, especially of water and $CO_2$, then takes place at clearly lower temperatures of usually less than 1000° C. A large proportion of the redox material of up to 98% often goes through the process unused, with correspondingly negative effects on efficiency. In addition, the reactions are limited by kinetics, heat and mass transport.

In the above mentioned literature, different concepts for receivers/reactors are described in which solar radiation is utilized for the reduction of redox material. These concepts follow different approaches, which depend, in particular, on the form of the redox material employed, and on the manner in which the redox material goes through the different steps of the cycle. In recent years, it has become clear that a high degree of heat recovery from the redox material is necessary for a high overall efficiency, because of the as yet low yields of redox material. Therefore, the most progressive receivers/reactors to date increasingly take heat recovery into account. In some of the concepts describes to date, heat recovery is an inherent component of the reactor. In Ermanoski, I. et al. (supra), the cleaving step has additionally been decoupled, because the cleaving reaction proceeds clearly more slowly than the reduction in the designated redox material.

In the processes described in the literature, there is a strong coupling between radiation absorption, reduction and heat recovery. Consequently, to date, no parameter window has been known with which the requirements for these subprocesses can be met satisfactorily.

From US 2013/0234069 A1 and US 2013/0004801 A1, reactors for operating solar-driven thermochemical processes are set forth. It is proposed to use liquid heat transfer media. However, this has the disadvantage that liquid media require both another solid medium for absorption in the receiver, and for heat transfer in the heat exchanger and in the reactor to transfer the heat from the liquid heat transfer medium to the solid redox material and vice versa. The two media must be in separated forms, because the reducibility of the redox material critically depends on the oxygen partial pressure in the surrounding atmosphere. The heat input into the redox material is limited by the wall between the redox material and the fluid. For operation, it is necessary that both the fluid and the wall material is stable at high temperatures, and that the wall material does not react with the redox material.

In addition, there are few liquid heat transfer media that are stable at the mentioned temperatures of clearly above 1000° C. Therefore, corresponding reactors involve particular technical claims and high safety requirements.

U.S. Pat. No. 8,420,032 B1 describes a reactor in which redox particles are transported by means of a screw. In the interior of the screw, heated redox particles fall down by gravity. A heat transfer is effected thereby from the particles in the downpipe in the middle of the screw to the upward transported redox particles.

In order to enable an efficient cleavage in a reactor, it is desirable to obtain a high yield. Thus, taking the material properties and process properties into account, as high as possible a degree of heat recovery is desirable. For the reduction of the redox material, a low oxygen partial pressure is necessary. To achieve this, a low intrinsic consumption is necessary. Further desirable is a continuous operation that is enabled despite the different reaction times for reduction, cleavage and heating. If the energy for the thermal reduction is provided by means of solar radiation, an efficient coupling thereof into the system is desirable. In addition, it should be possible to operate a reactor in a partial load range. In particular, a reactor that can be operated continuously and scalability of the process are desirable.

Although individual tasks can be accomplished with the reactors known from the literature, there has not been any reactor concept to date, especially no combination of receiver and reactor, that can meet all requirements of the overall process in a technically realizable way and satisfactorily with respect to the overall efficiency. Therefore, the object of the present invention is to provide a process and a reactor that avoid the disadvantages described in the prior art.

SUMMARY OF THE INVENTION

Surprisingly, it has been found that an efficient heat recovery in a heat exchanger is possible if the heat exchanger has a heat transfer medium in the form of solid particles.

A process is described and claimed for performing a chemical reaction consisting of at least two sequential reversible steps in a cycle, characterized in that a solid reactant is reduced in a first reaction chamber (1) with uptake of heat at a first temperature $T_1$, and said solid reactant is subsequently oxidized in a second reaction chamber (2) with release of heat at a second temperature $T_2$;

wherein temperature $T_1$ is higher than temperature $T_2$; and wherein sensitive heat of the solid reactant is transferred to a heat transfer medium at the temperature $T_1$ in a first heat exchanger (3) after the reaction is complete in said first reaction chamber (1); and said heat taken up by the heat transfer medium in the first heat exchanger (3) is transferred again to said solid reactant at the temperature $T_2$ in a second heat exchanger (4) after the reaction is complete in said second reaction chamber (2).

DESCRIPTION OF THE EMBODIMENTS

Therefore, in a first embodiment, the object of the present invention is achieved by a process for performing a chemical reaction consisting of at least two sequential reversible steps in a cycle, characterized in that a solid reactant is reduced in a first reaction chamber (1) with uptake of heat at a first temperature $T_1$, and said solid reactant is subsequently oxidized in a second reaction chamber (2) with release of heat at a second temperature $T_2$;

wherein temperature $T_1$ is higher than temperature $T_2$; and wherein sensitive heat of the solid reactant is transferred to a heat transfer medium at the temperature $T_1$ in a first heat exchanger (3) after the reaction is complete in said first reaction chamber (1); and said heat taken up by the heat transfer medium in the first heat exchanger (3) is transferred again to said solid reactant at the temperature $T_2$ in a second heat exchanger (4) after the reaction is complete in said second reaction chamber (2).

Figure 2:
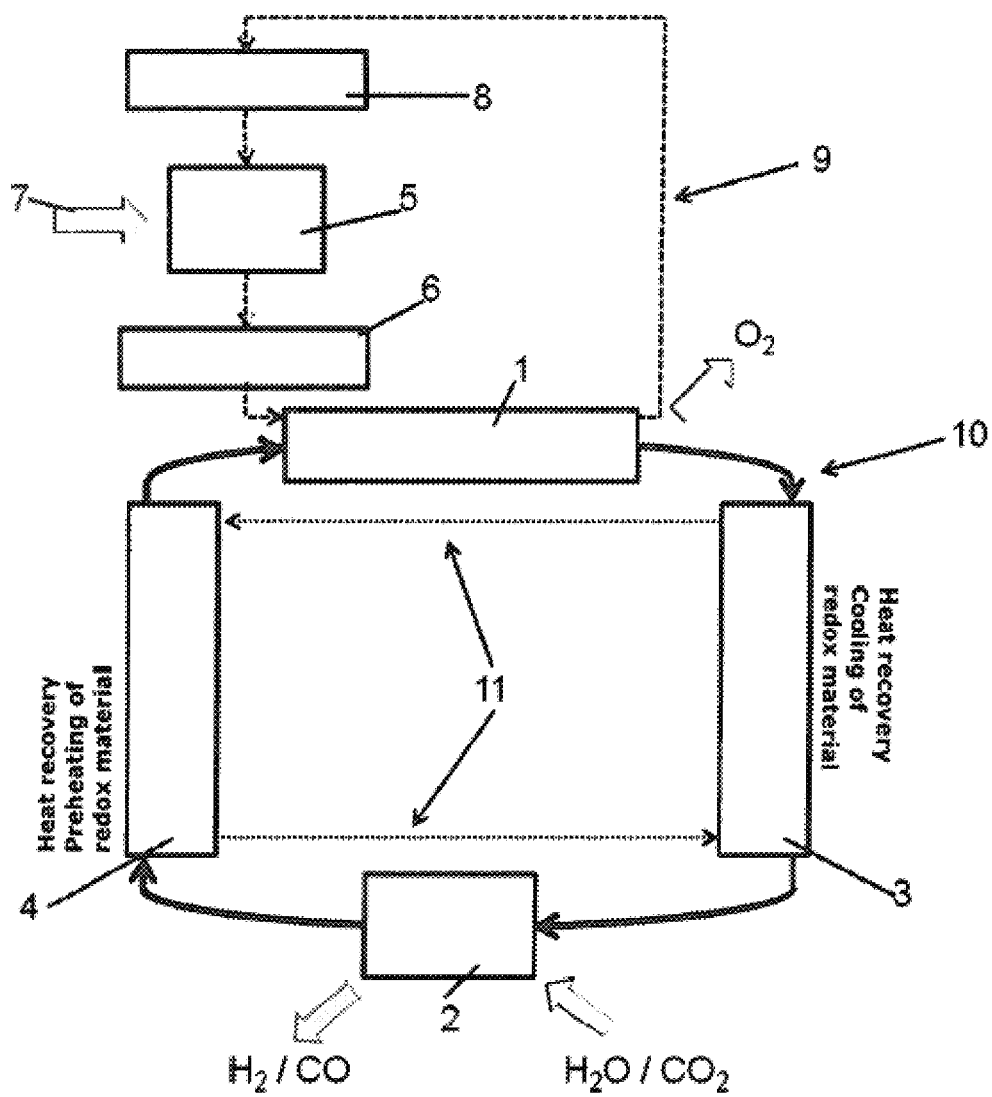
FIG. 2 is a schematic view of the equipment for the process.

FIG. 2 schematically shows a reactor of a preferred embodiment in which the process according to the invention can proceed.

In particular, the process comprises the following steps:
a) heating the solid reactant to temperature $T_1$;
b) reducing the solid reactant in the first reaction chamber at a first temperature $T_1$ to release oxygen;
c) transferring the heat from the solid reactant to the heat transfer medium to cool the solid reactant from temperature $T_1$ to temperature $T_2$ in the first heat exchanger (3);
d) oxidizing the solid reactant in the second reaction chamber (2) at a second temperature $T_2$;
e) transferring the heat from the heat transfer medium to the solid reactant in the second heat exchanger (4) to heat the solid reactant;

wherein the subsequent cycle comprises the above mentioned steps b) to e).

Thus, according to the invention, the solid reactant is lowered in the first heat exchanger (3) from a high temperature level $T_1$ after the reduction in the first reaction chamber (1) to the lower temperature level $T_2$, which then prevails in the second reaction chamber (2). The solid reactant is subsequently preheated again in the second heat exchanger (4). In step c), the heat cannot be transferred completely from the solid reactant to the heat transfer medium. A complete heat recovery would be desirable, but is only theoretically possible. In fact, the reactant does not reach temperature level $T_2$ yet in heat exchanger (3), and additional heat must be dissipated to the environment. A complete transfer of the heat from the heat transfer medium to the solid reactant is not possible in step e) of the process according to the invention either. Here, a significant heating of the solid reactant is effected by the heat transfer in the second heat exchanger (4).

In the oxidation reaction in the second reaction chamber (2), the temperature of the solid reactant is lower than in the reduction reaction in the first reaction chamber (1). In the process according to the invention, the sensitive heat present in the solid reactant in the first reaction chamber (1) can be stored by means of the heat transfer medium, and then employed to heat the solid reactant, which has a temperature $T_2$ after the oxidation reaction. A complete heating to temperature $T_1$ can be achieved with optimum heat transfer and insulation conditions. However, it may also be necessary to heat the solid reactant by means of other energy sources if the temperature $T_1$ for the solid reactant cannot be achieved by the heat transfer medium. Such energy sources have been described extensively in the literature. For example, heat can be generated by fossil fuels, nuclear energy or alternative energy sources (wind, sun, water), which is then fed into the process according to the invention. Preferably, any necessary heating is effected by means of solar radiation, especially by means of concentrated solar radiation.

Sequential steps within the meaning of the present invention are successive reaction steps of a chemical reaction in which the reaction products can be isolated. Reversible steps within the meaning of the present invention are reaction steps in which the chemical equilibrium can be adjusted, so that either the forward reaction or the back reaction proceeds preferentially.

Figure 1:
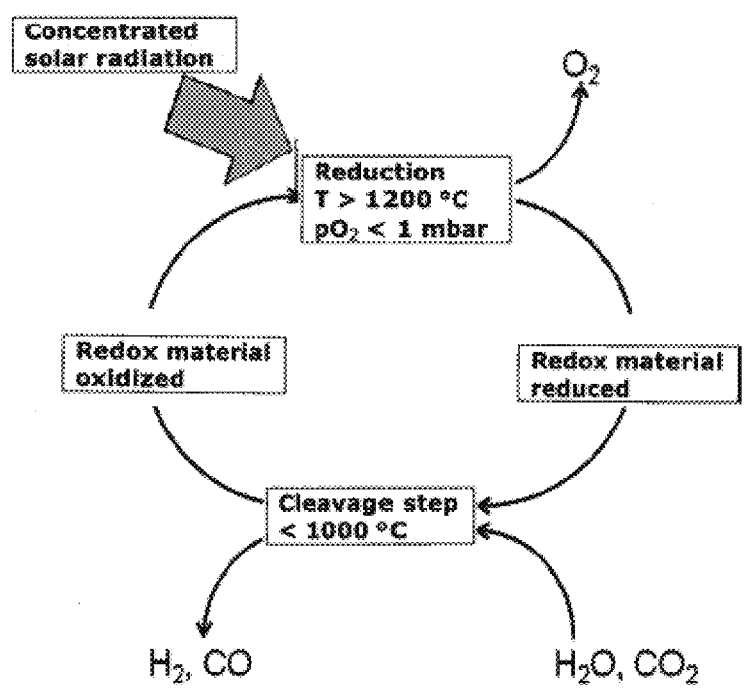
FIG. 1 is a schematic view of the process steps of the present invention.

A cycle within the meaning of the present invention is a process in which the at least two sequential reversible steps are performed repeatedly one after the other, as schematically shown in FIG. 1.

A chemical reaction within the meaning of the present invention is basically any chemical reaction that is performed in the presence of a solid reactant. Said solid reactant is preferably a chemical compound with redox properties. Chemical compounds with redox properties within the meaning of the present invention are compounds that can be reversibly oxidized and reduced. Advantageously, these chemical compounds with redox properties are selected from the group of metal oxides, mixed metal oxides, doped metal oxides, and mixtures thereof. Particularly preferred are metal oxides, because they are most widely applicable. The use of a multivalent metal oxide as the solid reactant has been found particularly advantageous, because it is particularly easy to regenerate, i.e., can easily switch between the oxidized and reduced states. A metal oxide is "multivalent" within the meaning of the invention when it has several oxidation states in parallel, especially if the metal is in an oxidation state of >+1, especially >+2.

Preferably, said metal oxides include ferrites and/or zinc oxides and/or manganese oxides and/or lanthanum oxides and/or cerium oxides and/or perowskites and/or oxides of general formula $M_x^{2+}Zn_{1-x}^{2+}Fe_2O_4$, wherein $M_x^{2+}$ is a divalent metal ion selected from the group consisting of magnesium, calcium, manganese, iron, cobalt, nickel, copper, zinc, strontium, tin, barium, cadmium and lead, wherein mixtures of such oxides may also be employed. Mixtures of the oxides are employed, in particular, if a release of hydrogen is to occur, because they are particularly efficient in this case. In principle, x in the general formula $M_x^{2+}Zn_{1-x}^{2+}Fe_2O_4$ is a number within a range of from 1 to 5, especially from 2 to 3. Cerium oxide is preferably employed as the metal oxide.

Preferably, the process according to the invention is employed for the following reaction types, which are stated by way of example:

| Reaction type | first step | second step |
| --- | --- | --- |
| $H_2$ production | $MeO_x + H_2O \rightarrow H_2 + MeO_y$ | $MeO_y \rightarrow MeO_x + \frac{1}{2} O_2$ |
| Reduction of carbon dioxide | $MeO_x + CO_2 \rightarrow MeO_y + CO$ | $MeO_y \rightarrow MeO_x + \frac{1}{2} O_2$ |
| Cleavage of nitrogen oxides | $MeO_x + NO_z \rightarrow MeO_y + \frac{1}{2} N_2$ | $MeO_y \rightarrow MeO_x + \frac{z}{2} O_2$ |
| Cleavage of $SO_3$/ production of $SO_2$ | $MeO_x + SO_3 \rightarrow MeO_y + SO_2$ | $MeO_y \rightarrow MeO_x + \frac{1}{2} O_2$ |
| Selective oxidation | $MeO_x + \frac{1}{2} O_2 \rightarrow MeO_y$ | $C_mH_n + MeO_y \rightarrow MeO_x + C_mH_nO$ |
| Dehydrogenations | $MeO_x + \frac{1}{2} O_2 \rightarrow MeO_y$ | $C_mH_n + MeO_y \rightarrow MeO_x + C_mH_{n-2} + H_2O$ |
| $H_2$ production | $Me + H_2O \rightarrow H_2 + MeO$ | $MeO \rightarrow Me + \frac{1}{2} O_2$ |
| $H_2$ production | $MX_y + HX \rightarrow MX_{y+1} + \frac{1}{2} H_2$ | $MX_{y+1} \rightarrow MX_y + \frac{1}{2} X_2$ |

In the Table, the reaction equations for stoichiometrically proceeding reactions are shown. However, it is also possible that the reactions do not proceed stoichiometrically. The corresponding adaptation of the reaction equation is well known to the skilled person. In the Table, Me represents a metal atom, X represents a halogen or pseudohalogen, subscripts n, m, x, y or z represent positive numbers. These may be integers. Since the reactions do not always proceed stoichiometrically, the subscripts may also represent rational numbers.

With the process according to the invention, water can be cleaved into hydrogen and oxygen, in particular. Further, it is possible to cleave $CO_2$ into CO and oxygen. The process according to the invention is preferably a process for cleaving water into hydrogen and oxygen, or $CO_2$ into CO and oxygen. In such a cycle, hydrogen is produced from water vapor, or carbon monoxide from carbon dioxide, preferably at temperatures within a range of from 800° C. to 1200° C. For example, a metal oxide system that can cleave oxygen from water molecules or from carbon dioxide and bind it reversibly into its crystal structure is used in a cycle.

In the cycle, such cleavage of oxygen and incorporation into the solid reactant takes place at a second temperature $T_2$. The then necessary release of oxygen from the solid reactant, whereby the latter is reduced, takes place at the first temperature $T_1$. To start the cycle, the solid reactant must first be heated to the temperature $T_1$. According to the invention, this is preferably done by means of concentrated solar radiation. It is possible to heat the solid reactant itself.

In an alternative preferred embodiment, the heat transfer medium is first heated by means of concentrated solar radiation (7) in the process according to the invention. The heat transfer medium then transfers the heat to the solid reactant, so that the latter obtains a temperature $T_1$ that is sufficient to reduce the solid reactant in a first reaction chamber.

The heating of the heat transfer medium by means of concentrated solar radiation (7) is effected, for example, in a receiver (5). Before the heat transfer medium heated therein is added to the cycle, it may be stored, for example, in a store (hot store) (6).

In a preferred embodiment, a first heat transfer medium is heated in a receiver (5), especially by means of concentrated solar radiation. The heated heat transfer medium is stored in a first store (hot store) (6) before it is employed for heating the solid reactant in the first reaction chamber (1). In the first reaction chamber (1), the first heat transfer medium releases its heat whereby it is cooled. The now cooled first heat transfer medium can then be stored in a second store (cold store) (8) before it is again heated in the receiver (5).

In this embodiment, the solid reactant is then passed from the first reaction chamber (1) into the first heat exchanger (3). In this heat exchanger (3), the heat of the solid reactant is transferred to a second heat transfer medium. The thereby cooled solid reactant is then employed in the second reaction chamber (2). Subsequently, it is heated again in the second heat exchanger (4) by means of the second heat transfer medium.

Figure 3:
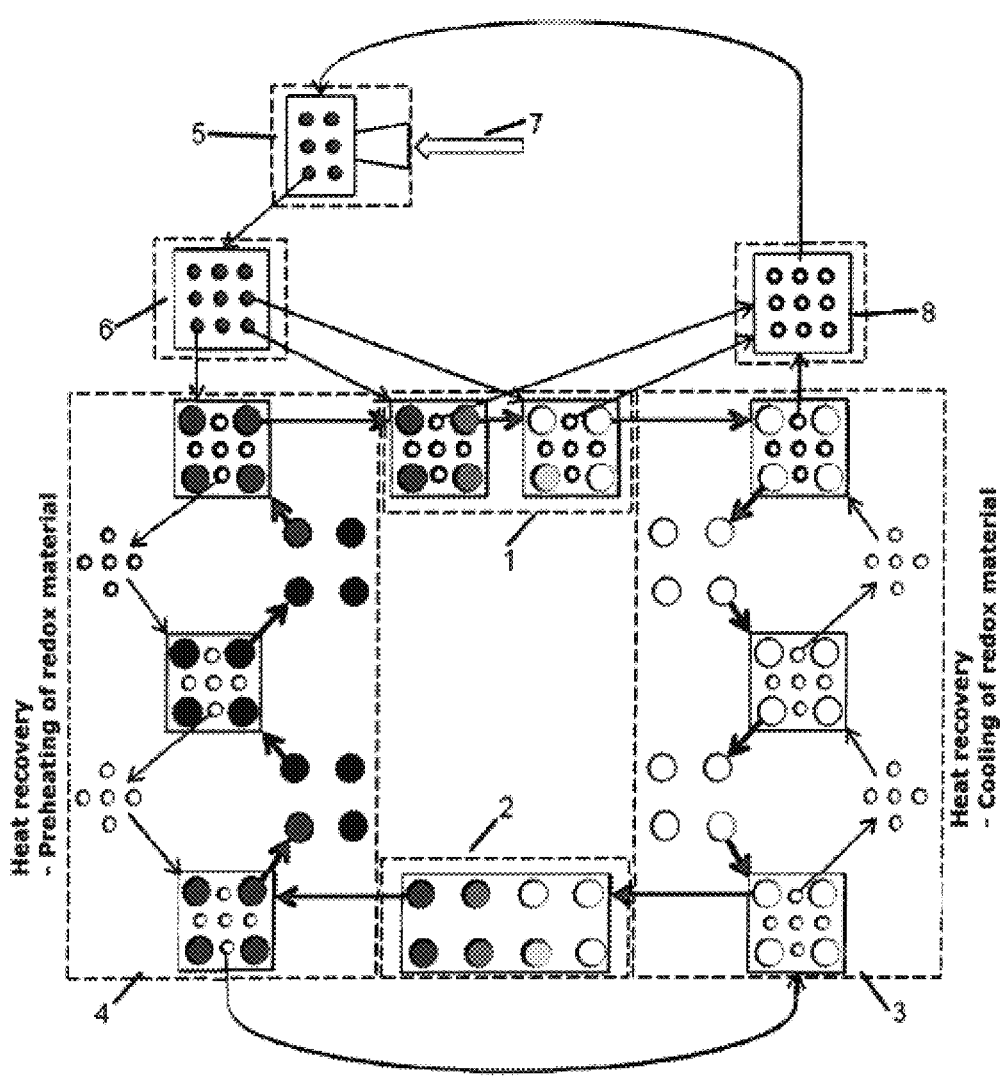
FIG. 3 is a schematic view of the flow process of the present invention.
Figure 4:
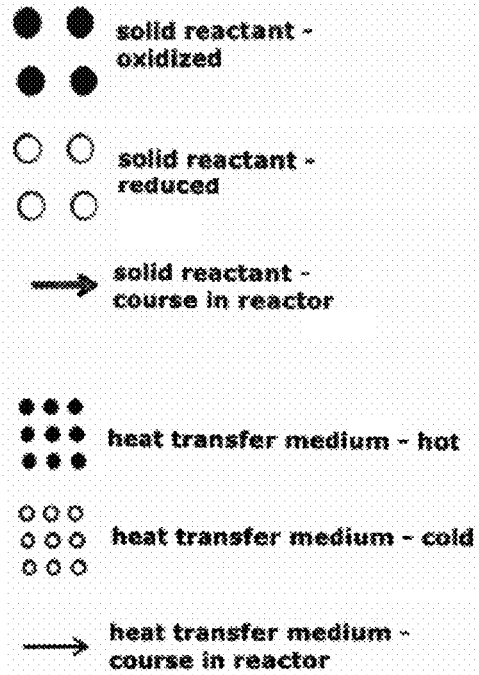
FIG. 4 is a symbol chart of the equipment and material of the present invention.

This embodiment is schematically shown in FIGS. 2 and 3. In FIG. 4, the symbols used in FIG. 3 are explained. The same symbols are also used in FIG. 4, in which an alternative embodiment, which is also preferred, is shown.

As schematically shown in FIG. 2, the process according to the invention includes three independent particle cycles in this embodiment. In a first cycle (cycle 1) (9), which is shown as a dashed line in FIG. 2, the first heat transfer medium is circulated. This includes the heating in the receiver (5), the storing in the first store (6), the transfer of the heat from the first heat transfer medium to the solid reactant in the first reaction chamber (1), and the storage of the then cooled heat transfer medium in the second store (8).

In a further cycle (cycle 3) (11), which is shown in FIG. 2 by means of dotted lines, a second heat transfer medium is circulated. This includes the uptake of heat from the solid reactant in the first heat exchanger (3), and the release of heat to the solid reactant in the second heat exchanger (4). The first heat transfer medium and the second heat transfer medium may be different. It is also possible that the first and second heat transfer media are identical. The separation of the two heat transfer medium cycles has the advantage that the efficiency of the process can be improved.

The solid reactant is also circulated in the process according to the invention (cycle 2) (10). This recirculation corresponds to the process control in a thermochemical cycle, as schematically shown in FIG. 1. In addition, between the reduction and oxidation in the first reaction chamber (1) and the second reaction chamber (2), respectively, there is heat transfer to a heat transfer medium, or from a heat transfer medium.

In FIG. 3, the presence and distribution of solid reactant and heat transfer medium is also shown for the embodiment according to the invention. Their course within the process, i.e., the path of the respective particle within the reactor in the course of the process, is shown by arrows. Arrows printed in boldface represent the path of the solid reactants, while the course of the heat transfer medium is shown in thin arrows. The oxidation state of the solid reactant and the temperature of the heat transfer medium are also schematically shown, like in FIG. 5. The corresponding explanations are also found in FIG. 4, wherein a dark shade of the solid reactant shows its oxidized form, while a white representation indicates its reduced form. The temperature of the heat transfer medium is shown by the thickness of the frame. The thicker the frame, up to a complete filling of the circle, the hotter is the heat transfer medium.

Figure 5:
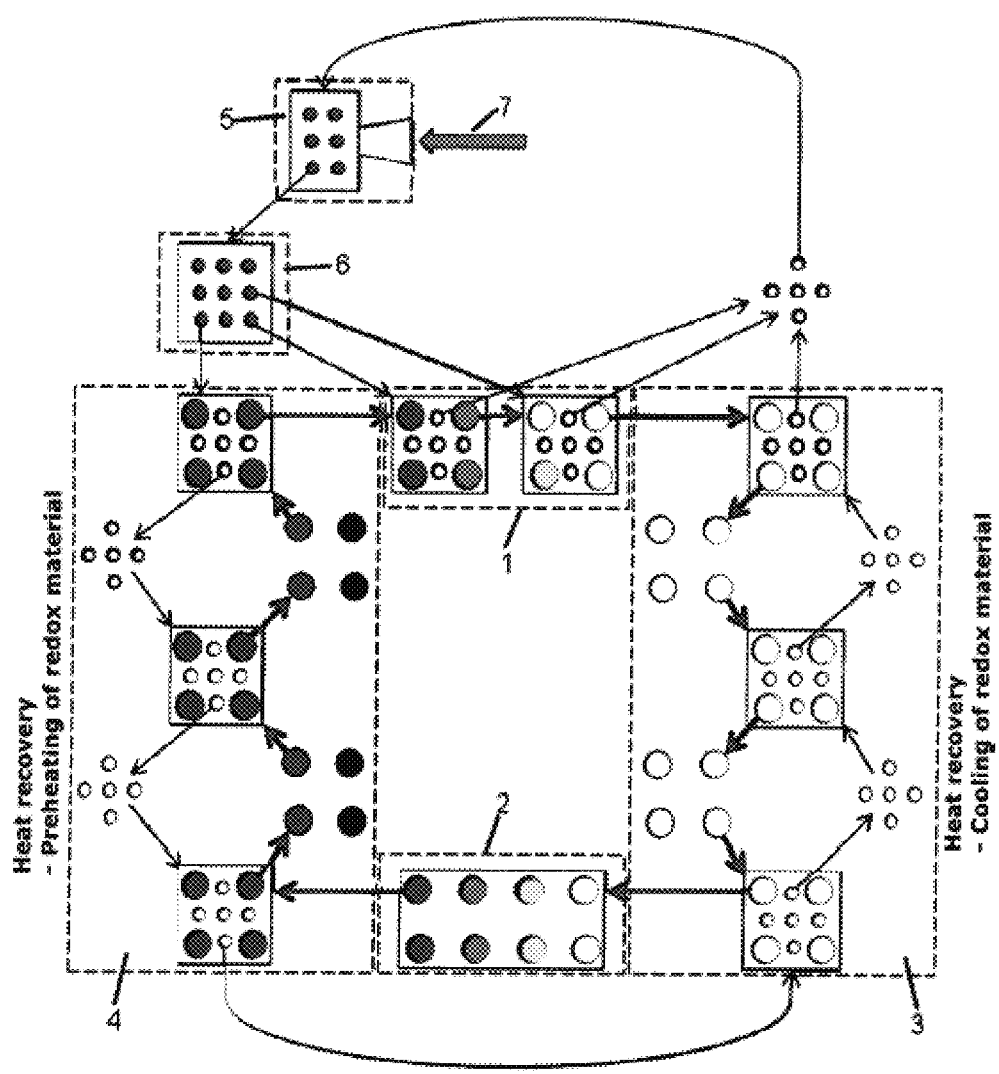
FIG. 5 is a schematic view of an alternate process of the present invention.

In an alternative process, which is also preferred, as schematically shown in FIG. 5, the heat transfer medium in the receiver (5) is preferably heated by means of concentrated solar radiation (7), and subsequently stored in a store (hot store) (6). Now, the heated heat transfer medium can be employed for heating the solid reactant in the first reaction chamber (1) on the one hand. In this embodiment, it is also possible that the heated heat transfer medium is employed in the second heat exchanger (4) to heat the solid reactant. In the second heat exchanger (4), the heat transfer medium cools down by releasing the heat to the solid reactant. The this cooled heat transfer medium can then be employed to take up the heat from the solid reactant in the first heat exchanger (3). However, in this alternative embodiment, the heat transfer medium is again heated in the receiver (5) to subsequently heat the solid reactant.

If, in this embodiment, the heat transfer medium is passed from the store into the first reaction chamber (1), the heating of the solid reactant is effected there. Subsequently, the heat transfer medium is again passed into the receiver (5) to be heated again. In contrast to the process shown in FIG. 3, there are no separate circulations here with first and second heat transfer media.

According to the invention, the heat transfer medium is basically suitable not only for heating the solid reactant in step a) of the process according to the invention. Rather, the heat transfer medium, which is in the form of solid spherical particles, serves the function of taking up sensitive heat contained in the process according to the invention for heating the solid reactant, storing it, and transferring it to the solid reactant when needed. Thus, the heat transfer medium performs several tasks in the process according to the invention. In a preferred embodiment, if the heat transfer medium is heated by means of concentrated solar radiation, the heat transfer medium additionally serves as an absorbing medium for the highly concentrated solar radiation. The hot particles, i.e., the hot heat transfer medium, can be stored and supplied to a reaction chamber when needed. In the first reaction chamber (1), the stored heat is provided to the solid reactant to enable its reduction.

The heat transfer medium according to the invention is in the form of solid spherical particles. "Spherical particles" as used in the present invention means particles that have an at least two-dimensional, especially three-dimensional extension. Such extension need not be regular in all directions of space. "Spherical particles" within the meaning of the present invention include, for example, rod-like particles, but also globular particles. The outer shape of such particles may be regular or irregular. For example, the heat transfer medium is a powder or granules.

The solid reactant is also preferably in the form of solid spherical particles. Here too, a regular structure is not necessary, but included in the present invention.

In order to enable an effective heat transfer in the present process from a solid reactant to the heat transfer medium, the two kinds of particles are contacted with one another. After the heat transfer, the solid reactant and the heat transfer medium are separated again. In order to enable separation, the solid reactant and the heat transfer medium must differ in at least one physical parameter, such as, for example, particle size, weight, density, or magnetic properties. Preferably, the solid reactant and the heat transfer medium have differing particle sizes. This enables separation, for example, through a sieve.

The particle size within the meaning of the present invention is the average particle size. For particles having an irregular geometric extension in the different directions of space, a stated diameter corresponds to the largest spatial extension. The particle size can be determined by means of scanning electron micrographs. Preferably, the solid reactant has a larger particle size than that of the heat transfer medium. This improves the heat transfer between the two particles. Basically, heat transfer is better with smaller particles than with larger particles, which is why the particle size of both the solid reactant and the heat transfer medium is as small as possible, but still differing.

The optimum particle size for the process according to the invention depends on many factors. In addition to as good as possible a heat transfer, the handling and the stability, inter alia, and other items play a role. Preferably, however, the particle size of the heat transfer medium is within a range of from 0.1 mm to 5 mm, especially within a range of from 0.2 mm to 3 mm. The particle size of the solid reactant is preferably within a range of from 0.5 mm to 10 mm, especially from 1 mm to 7 mm. The determination of particle size is effected by means of scanning electron microscopy.

In an alternative embodiment, the solid reactant and the heat transfer medium differ in density. This enables separation by a gas stream, whereby the lighter particles are taken by the air stream and carried away, while the heavier particles follow gravity and collect on the bottom of a reaction chamber or a suitable collecting device. A gas stream within the meaning of the present invention is any streaming gas or mixture of gases that is capable of separating the existing particles without influencing them chemically or physically in their capacity of solid reactant or heat transfer medium.

A separation of the particles, i.e., of the solid reactant from the heat transfer medium, is also possible if the two kinds of particles differ in their magnetic properties. Here, separation can be effected by applying an external magnetic field.

Preferably, the solid reactant and the heat transfer medium differ in particle size.

In another embodiment, the object of the present invention is achieved by a reactor for performing a process according to any of claims 1 to 5. The reactor is characterized by comprising two reaction chambers (1, 2) that include at least one solid reactant, and at least two heat exchangers (3, 4) with solid spherical particles as heat transfer media.

More preferably, the reactor consists of two reaction chambers (1, 2) and of two heat exchangers (3, 4). Both the reaction chambers and the heat exchangers may be segmented into smaller structural units inside. FIGS. 3 and 5 schematically show reactors of preferred embodiments. In these, the first reaction chamber (1) is in contact with a first heat exchanger (3). The latter is in turn in contact with a second reaction chamber (2). Following the cycle, the second reaction chamber (2) is in contact with a second heat exchanger (4), which is in turn in contact with the first reaction chamber (1).

Therefore, a reactor according to the invention is preferably characterized in that
a first reaction takes place at a temperature $T_1$ in said first reaction chamber (1); and
a second reaction takes place at a temperature $T_2$ in a second reaction chamber (2); wherein
temperature $T_1$ is higher than temperature $T_2$, wherein at least one first heat exchanger (3) is arranged in such a way that the heat transfer medium contained therein takes up the sensitive heat of the solid reactant; and
at least one second heat exchanger (4) is arranged in such a way that the heat transfer medium contained therein releases the heat taken up in said first heat exchanger (3) to the solid reactant in the second reaction chamber (2) after the reaction is complete.

In order to enable as efficient as possible a heat recovery, a quasi countercurrent principle is produced with the heat transfer medium and the solid reactant through a suitable particle stream combination. This countercurrent principle enables heat recovery rates of 50% or more.

In a preferred embodiment, the reactor further comprises a receiver (5). In this receiver (5), the heat transfer medium can be heated, for example, by concentrated solar radiation (7). This enables any geometric arrangement of the receiver towards the solar irradiation (7), whereby a good heating is enabled. Alternatively, heating can be effected, for example, by means of fossil fuels, nuclear energy or other known kinds of heat energy generation. However, it is also possible to heat the solid reactant in the receiver (5), and to feed the solid reactant into the actual cycle only thereafter.

In a preferred embodiment, a first heat transfer medium is heated in said receiver (5), then stored in a store (hot store) (6), before it is employed for heating the solid reactant in said first reaction chamber (1). The heat transfer medium cooled thereby is then stored in a second store (cold store) (8), before it is again heated in the receiver (5). In this preferred embodiment, which is schematically shown in FIG. 3, the reactor further comprises a receiver (5) and two stores (6, 8) in addition to said first and second reaction chambers (1, 2), first and second heat exchangers (3, 4). Thus, the reactor preferably comprises a receiver (5) and/or one or more stores (6, 8).

Also preferred is the embodiment shown in FIG. 5, in which the reactor also includes a store (hot store) (6) in addition to a receiver (5). In the receiver (5), the heat transfer medium is heated, for example, by means of concentrated solar radiation (7). Subsequently, the heat transfer medium is stored in a store (hot store) (6) before it is fed into the actual reactor, namely into both the first reaction chamber (1) and the second heat exchanger (4).

If the temperature required for the reaction is provided by means of concentrated solar radiation (7), the present reactor is a thermochemical solar reactor. This embodiment is particularly preferred presently.

In the receiver (5), the highly concentrated solar radiation (7) is absorbed by the heat transfer medium. Because of the heat recovery, which takes place in the reactor on principle, the heat transfer medium must be heated only to such an extent that the heat that is not recovered and the enthalpy to be applied for the reduction are balanced. The particle stream of the heat transfer medium can be adapted to the irradiation in the receiver (5) in such a way that the desired and necessary temperature rise, i.e., the balance of the temperature difference still missing after the heat recovery, can also be achieved under partial load.

In contrast to reactors known from the prior art, no particular requirements are placed on the atmosphere in the receiver (5) of the present invention in any embodiment. Thus, it is possible to dispense with a window through which the solar irradiation may occur. This enables irradiation under ambient conditions, whereby reflection losses and absorption losses can be avoided. In addition, a simpler structure of a receiver (5) is possible, whereby great technical challenges, which the use of a window at high concentrations and using particles brings about, can be avoided. For example, the receiver 5 is a falling film receiver with an open cavity, which can be realized without the complicated use of a beam-down optical system.

The advantage of the present invention resides in the fact that not only a concept for the individual process steps in a reactor is provided. Rather, because of its structure, the individual steps, namely reduction and oxidation of the solid reactant, and the recovery and transfer of heat, are decoupled. In addition, the heat input into the cycle 1 (9) is decoupled. This enables every single step to be optimized, namely the reduction of the solid reactant in the first reaction chamber (1) at a first temperature $T_1$, the transfer of the heat from the solid reactant to the heat transfer medium in a first heat exchanger (3), the oxidation of the solid reactant in the second reaction chamber (2), the transfer of heat from the heat transfer medium to the solid reactant in the second heat exchanger (4), and the coupling of the solar radiation into the reaction cycle taking place in the reactor.

Therefore, in a preferred embodiment, said first reaction chamber (1) is a reduction reactor in which said solid reactant is reduced at a first temperature $T_1$. Further preferably, said second reaction chamber (2) is a cleavage reactor in which said solid reactant is oxidized at a temperature $T_2$.

In a preferred embodiment, in which the reactor further comprises a receiver (5) and at least one store (hot store) (6) for the heat transfer medium, the heat transfer medium is heated in the receiver (5). Subsequently, the heat transfer medium arrives at the store (hot store) (6). Such a store (hot store) (6) enables the thermochemical cycle to be continued even without direct solar irradiation. This enhances the efficiency of the process, whereby the economical efficiency of the operation of the reactor according to the invention is enhanced.

Then, the heat transfer medium can be removed from the store when needed. The heat transfer medium can then be supplied to the first reaction chamber (1). In a preferred embodiment, which is schematically shown in FIG. 5, it can be supplied at first to the second heat exchanger (4). The heat transfer medium is represented in the form of circles in FIG. 5. In FIG. 4, this is explained correspondingly for both FIG. 3 and FIG. 5. Both the solid reactant and the heat transfer medium are represented as circles in FIG. 5. The larger circles represent the solid reactant, while the smaller circles represent the heat transfer medium. In addition, as schematically shown in FIG. 4, it is shown when the solid reactant is in the oxidized or reduced form. The temperature of the heat transfer medium is also shown, wherein a thicker line of the circle represents a higher temperature than that represented by a thinner line of the circle. The course of the solid reactant and of the heat transfer medium during the process according to the invention is represented by arrows. Here too, the course of the solid reactants is represented by arrows printed in boldface, while thinner arrows show the course of the heat transfer medium in the reactor. Squares shown within the reaction chambers (1, 2) and heat exchangers (3, 4) indicate reactions that take place step by step within the chambers/heat exchangers, which may be adapted to the reaction taking place.

In a preferred embodiment, the heat transfer medium is removed from the store (6) and supplied to the first reaction chamber (1) as schematically shown in FIG. 3, or in a further embodiment, which is also preferred, it is supplied to the second heat exchanger (4) as schematically shown in FIG. 5. Therein, the heat transfer medium is contacted with the solid reactant, which is preferably also in particle form, so that the heat can be optimally transferred between the particles. The atmospheres in the respective chambers, i.e., in the first heat exchanger (3), the second heat exchanger (4) as well as the first reaction chamber (1) and the second reaction chamber (2), can be adjusted individually each by decoupling the individual chambers and thus the decoupling the reactions taking place therein, so that the overall process proceeds as efficiently as possible. For example, a pressure separation of the first reaction chamber (1), the second reaction chamber (2) as well as the first heat exchanger (3) and the second heat exchanger (4) can be realized, for example, by a pressure gradient or locks. It should be noted that a reduction takes place in the first reaction chamber (1). This requires a low oxygen partial pressure. On the other hand, a high total pressure is advantageous for the heat recovery in both the first heat exchanger (3) and the second heat exchanger (4). In contrast, an overall reduced total pressure at a low oxygen partial pressure has advantages regarding the efficiency of the overall system, because the use of flushing gases in the reaction chamber (1) can be limited thereby. The oxygen produced is continuously removed, whereby the total pressure is kept constantly low. This shifts the equilibrium reaction taking place in the reduction reactor (1) towards the products. According to the invention, it is possible to adjust the total pressure as well as the oxygen partial pressure in the first reaction chamber (1), the second reaction chamber (2), the first heat exchanger (3) and the second heat exchanger (4) independently of each other.

After the desired reaction progress or heat transfer has been achieved in the reactor according to the invention, the two particle types, i.e., the solid reactant and the heat transfer medium, are separated from each other. Possible methods are known to the skilled person and have already been explained.

By combining several individual heat exchanger stages within the first heat exchanger (3) and/or within the heat exchanger (4), which function according to the principle of mixing, heat transfer and separation of the particles, a quasi countercurrent can be realized in the interior of the heat exchangers (3, 4). Also within the first reaction chamber (1), a division into several smaller chambers within the actual reaction chamber (1) appears reasonable, in which the heat input by the heat transfer medium and the prevailing partial pressure for the different subchambers can be optimally adjusted. A partial pressure that decreases from subchamber to subchamber within the first reaction chamber (1) is particularly advantageous, because the pumping expenditure of the necessary vacuum pumps can be minimized here. In the case of a combination in series of the subchambers within the first reaction chamber (1), a combination according to a countercurrent principle is also possible. Thereby, the temperature rise can be increased, and the necessary mass flow of the heat transfer medium can be reduced. The subchambers are represented schematically in FIGS. 3 and 5 in the form of squares as a possible embodiment.

What is critical for a good heat transfer between the solid reactant and the heat transfer medium is the mutual mass ratio of the two particles. The ratio of the particle mass flows can be adjusted optimally for each reaction chamber and for each heat exchanger, since the individual reactions take place independently. After the heat transfer media have proceeded through the actual reaction, they can be recycled to the receiver (5) after cooling, and heated therein.

In one embodiment of the invention, the reactor does not have the cycle 1 (9) as represented schematically in FIG. 2. Here, it is possible to directly irradiate the solid reactant within the first reaction chamber (1) and thus to enable the reduction reaction. In this embodiment too, a separation of the reaction chambers (1, 2) and heat exchangers (3, 4) is performed, wherein the solid heat transfer medium takes up the heat from the solid reactant and rereleases the heat to the solid reactant in the first and second heat exchangers, respectively. The use of a store is possible here too. The heated solid reactant can be stored in such a store.

By decoupling the individual steps, i.e., heat input, reduction step, cleavage step and the two heat recovery steps, in the heat exchangers (3, 4), it is possible to adjust the dwelling times in the first reaction chamber (1), in the second reaction chamber (2), in the first heat exchanger (3), in the second heat exchanger (4) and in the receiver (5) independently of each other to optimize the overall efficiency. The separation of the individual steps clearly simplifies the further development of the individual components. Clear interfaces can be defined, so that it is possible to work on the technical realization of the individual components separately.

Since the reduction is decoupled from heat absorption, advances in the field of chemical compounds having redox properties can be transferred simply to the reactor according to the invention, and to the process according to the invention. If the reactor according to the invention has a receiver (5) in which the heat transfer medium is heated, the design depends on the properties of the solid reactant. According to the invention, it is now possible to achieve adaptation to new materials, for example, by adapting the dwelling times and mass flows.

The use of a solid spherical particle as a heat transfer medium has the advantage, over the liquid known from the prior art, that the heat transfer medium can be irradiated directly. In addition, it can be brought into direct contact with the solid reactant, whereby a good heat transfer is enabled. In contrast, the liquid heat transfer medium as disclosed in US 2013/0234069 A1 requires that the redox material, i.e., the solid reactant, is present as a layer on a wall through which the heat is transferred from the heat transfer fluid to the solid reactant. On the one hand, this inhibits the heat transport, and on the other hand, an additional mass, which must also be heated and cooled between the cycles is introduced into the system. In addition, the layer of the solid heat transfer medium must remain stable even in cyclic operation, which has been found difficult to execute.

A suitable safe inert liquid heat transfer medium has not been described in the prior art. In addition, with liquid heat transfer media, there is a danger of solidification, whereby the properly occurring cycle can no longer be performed. This involves another particular technical challenge, because the heat transfer medium would have to be liquid at both the first temperature $T_1$, and the second temperature $T_2$. In addition, with liquid heat transfer media, there is a danger of solidification especially in standstill times, mainly at night in solar operation.

The presently possible quasi countercurrent heat transfer enables a high heat recovery. The selection of the heat transfer medium is performed after the selection of the solid reactant and of the chemical reaction to be performed. It is critical that the heat transfer medium withstands the occurring temperature variations between the temperature $T_1$ and the temperature $T_2$. A reaction between the heat transfer medium and the material to be cleaved should take place at none of the temperatures. If it should be possible in principle that a reaction takes place between the heat transfer medium and the material to be cleaved, the corresponding reaction kinetics must be significantly slower than that of the reaction between the material to be cleaved and the solid reactant. The reaction between the material to be cleaved and the solid reactant must be the main reaction. In addition, the material must be a solid at both the first temperature $T_1$ and the second temperature $T_2$. Therefore, the heat transfer medium can be made of the same material as the solid reactant in principle. However, it is to be noted that the heat transfer medium and the solid reactant have different compositions within a reaction taking place. Thus, for example, the solid reactant may include cerium oxide, and the heat transfer medium may include a doped cerium oxide. In a suitable material to be cleaved, the doping affects the reaction kinetics in such a way that the actual cleavage reaction takes place almost exclusively with the solid reactant.

In a preferred embodiment, the heat transfer medium is selected from the group comprising ceramics, $SiO_2$, $TiO_2$, $Al_2O_3$, $Y_2O_3$, $ZrO_2$, Pt, W, Ta, Mo, and mixtures thereof. Preferably, the temperature $T_1$ is within a range of from 1000° C. to 1400° C., and the second temperature $T_2$ is within a range of from 500° C. to 1200° C. The first temperature $T_1$ is preferably different from the second temperature $T_2$.

EXAMPLE

Cerium oxide particles having an average size of 3 mm were employed as the solid reactant. An open cavity with a free falling particle film was used as the receiver. Ceramic particles with an average particle size of 0.5 mm made of alumina were employed as heat transfer media. The heat transfer medium heated up from 1300° C. to 1400° C. under concentrated solar radiation. The hot heat transfer media at 1400° C. were conveyed into a well insulated store.

From there, the hot heat transfer media were brought into contact with the cerium oxide to heat it and to reduce it. For this purpose, the particle types were mixed and left in contact until the designated amount of heat had been transferred, or until the necessary reduction had taken place. Subsequently, the particle types were separated by a sieve.

In addition, the principle consisting of mixing, heat transfer and separation was utilized for heat recovery. For this purpose, a quasi countercurrent heat exchanger was realized by combining several heat recovery stages, which transferred a major part of the heat from hot reduced cerium oxide particles to the cooler oxidized cerium oxide particles using the heat transfer medium.

The reduction and cleavage took place in reactors whose atmosphere was adjusted according to the parameters known in the prior art. In the field of heat recovery, a preliminary reduction could be achieved when the solid reactant was preheated. For the final reduction, a number of reduction reactors with decreasing total pressures were used in which the hot heat transfer medium was added to the redox material in an optimum amount. In the cleavage reactor, the reduced cerium oxide particles were contacted with steam or $CO_2$ at a temperature of 900° C. The dwelling times in the individual reaction chambers and heat exchangers could be adjusted independently from one another. Also, the pressures in the chambers and heat exchangers could be adjusted independently from one another. The transport of the particles was realized by insulated transport containers, by pneumatic methods, or by means of a conveying screw.

The invention claimed is:

1. A process for performing a chemical reaction consisting of at least two sequential reversible steps in a cycle, characterized in that a solid reactant is thermo-chemically reduced in a first reaction chamber (1) with uptake of heat at a first temperature ($T_1$) in the range of from 1,000° C. to 1,400° C., and said solid reactant is subsequently oxidized in a second reaction chamber (2) with release of heat at a second temperature ($T_2$) in the range from 500° C. to 1,200° C.;

wherein said first temperature ($T_1$) is higher than said second temperature ($T_2$); and wherein sensible heat of said solid reactant is transferred to a solid heat transfer medium at said first temperature ($T_1$) in a first heat exchanger (3) after the thermo-chemical reduction of the solid reactant in said first reaction chamber (1) is complete; and said sensible heat taken up by said solid heat transfer medium in said first heat exchanger (3) is transferred to said solid reactant at said second temperature ($T_2$) in a second heat exchanger (4) after said solid reactant is subsequently oxidized in said second reaction chamber (2) where there is a release of heat at the second temperature ($T_2$); and wherein to enable heat transfer from the solid reactant to the solid heat transfer medium, the surfaces of the solid reactant and the solid heat transfer medium touch each other.

2. The process according to claim 1, characterized by comprising the following steps:

a) heating the solid reactant to said first temperature ($T_1$);
b) reducing said solid reactant in said first reaction chamber at said first temperature ($T_1$); to release oxygen;
c) transferring the heat from said solid reactant to said solid heat transfer medium to cool said solid reactant from said first temperature ($T_1$) to said second temperature ($T_2$) in said first heat exchanger (3);
d) oxidizing said solid reactant in said second reaction chamber (2) at said second temperature ($T_2$);
e) transferring the heat from said solid heat transfer medium to said solid reactant in said second heat exchanger (4) to heat said solid reactant;
wherein the at least two subsequent reversible steps in the cycle comprises the above mentioned steps b) to e).

3. The process according to claim 2, characterized in that said solid reactant is heated by means of concentrated solar radiation (7) in step a).

4. The process according to claim 2, characterized in that, in step a), said solid heat transfer medium is heated by means of concentrated solar radiation (7), and the heat is transferred therefrom to said solid reactant.

5. The process according to claim 4, characterized in that said heated solid heat transfer medium is stored in a store (6) before it is employed in the cycle.

6. A reactor for performing the process according to claim 1, characterized by comprising said first reaction chamber (1) and said second reaction chamber (2) that includes the solid reactant, and said first heat exchanger (3) and said second heat exchanger (4) with solid spherical particles as heat transfer media.

7. The reactor according to claim 6, characterized in that a first reaction takes place at said first temperature ($T_1$) in said first reaction chamber (1); and a second reaction takes place at said second temperature ($T_2$) in said second reaction chamber (2); wherein said first temperature ($T_1$) is higher than said second temperature ($T_2$), wherein said first heat exchanger (3) is arranged in such a way that said solid heat transfer medium contained therein takes up said sensible heat of the at least one solid reactant; and said second heat exchanger (4) is arranged in such a way that said solid heat transfer medium contained therein releases the heat taken up in said first heat exchanger (3) to said at least one solid reactant in said second reaction chamber (2) after the reaction is complete.

8. The reactor according to claim 6, characterized in that said first reaction chamber (1) is a reduction reactor in which said solid reactant is reduced at said first temperature ($T_1$).

9. The reactor according to claim 6, characterized in that said second reaction chamber (2) is a cleavage reactor in which said solid reactant is oxidized at said second temperature ($T_2$).

10. The reactor according to claim 6, characterized in that said solid reactant is a chemical compound with redox properties.

11. The reactor according to claim 6, characterized in that said heat transfer medium is selected from the group comprising ceramics, $SiO_2$, $TiO_2$, $Al_2O_3$, $Y_2O_3$, $ZrO_2$, Pt, W, Ta, Mo, and mixtures thereof.

12. The reactor according to claim 6, further comprising a receiver (5) and/or one or more storage container (6, 8) for said solid heat transfer medium.

13. The reactor according to claim 6, characterized by being a thermochemical solar reactor.

* * * * *